Nov. 16, 1965 T. J. WEIR 3,217,849
SPEED AND TEMPERATURE CONTROLLED COUPLING DEVICE
Filed Oct. 2, 1962 4 Sheets-Sheet 1

INVENTOR.
THOMAS J. WEIR
BY
*Lockwood, Woodard, Smith & Weikart*
Attorneys

Nov. 16, 1965 T. J. WEIR 3,217,849
SPEED AND TEMPERATURE CONTROLLED COUPLING DEVICE
Filed Oct. 2, 1962 4 Sheets-Sheet 2

INVENTOR.
THOMAS J. WEIR
BY
Lockwood, Woodard, Smith & Weikart
Attorneys

Nov. 16, 1965 T. J. WEIR 3,217,849
SPEED AND TEMPERATURE CONTROLLED COUPLING DEVICE
Filed Oct. 2, 1962 4 Sheets-Sheet 3

INVENTOR.
THOMAS J. WEIR
BY
Lockwood, Woodard, Smith & Weikart
Attorneys

United States Patent Office 3,217,849
Patented Nov. 16, 1965

3,217,849
SPEED AND TEMPERATURE CONTROLLED COUPLING DEVICE
Thomas J. Weir, Indianapolis, Ind., assignor to Schwitzer Corporation, Indianapolis, Ind., a corporation of Indiana
Filed Oct. 2, 1962, Ser. No. 227,744
6 Claims. (Cl. 192—82)

This invention relates generally to fluid coupling devices, and more particularly, to a fluid coupling adapted to drive an accessory device, such as a cooling fan, from an internal combustion engine.

Automotive vehicles, such as passenger automobiles and busses, are being provided with air conditioning equipment, the condensing element of such equipment being mounted in front of the cooling radiator of the engine. The air flowing through the condensing element is heated thereby and then flows through the cooling radiator of the engine thereby affecting the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects, the cooling fan of the engine is provided with a fluid coupling device having temperature responsive means controlled either by the temperature of the air flowing through the radiator or by the temperature of the water circulating through the engine cooling system. The degree of coupling between the fan and the engine is controlled by the temperature responsive means to provide direct coupling of the fan to the engine when the air or the cooling water is at relatively high temperatures and to effect a certain degree of slip within the coupling to drive the fan at lower than normal speeds when the temperature of the air or cooling water is relatively low. This temperature variable coupling has the advantage of decreasing the power supplied to the fan by the engine when less air is needed for cooling purposes.

In vehicles incorporating fluid coupling fan drive devices of the type described, there remains the problem of fan noise as the engine speed increases at low vehicle speeds during the normal gear changes taking place upon acceleration of the vehicle from rest. It is desirable to limit fan speed at low vehicle speeds in order to avoid the noise which would otherwise be quite apparent at these times. It is also advisable to limit fan speed and thereby the fan noise and fan power requirement even at the higher vehicle speeds, inasmuch as the radiator air flow caused by vehicle motion at higher speeds is usually adequate for cooling purposes.

A very important step in limiting fan speeds has been made by employing a thermostatic control responsive to internal temperatures in the coupling unit. This is described in my copending application entitled "Temperature Modulated Fluid Coupling," bearing Ser. No. 220,717, and filed Aug. 31, 1962. The internal thermostatic control is quite effective to limit fan speed when the coupling fluid temperature is below a certain level, but its speed limiting capability decreases over a narrow range of temperatures above this level.

Accordingly, the principal object of this invention is to provide a variable coupling device for driving an automobile engine fan wherein means is provided for causing the engine fan to revolve at relatively low speeds while the engine transmission completes the normal sequence of gear changes.

It is a further object of this invention to provide a fluid coupling fan drive unit responsive to the combination of ambient air temperature, fan speed, and coupling slip speed to control the degree of coupling between the fan and fan drive pulley.

It is a still further object of the invention to provide a fluid coupling unit requiring no external thermostatic control means for controlling the torque transmitted by the coupling unit.

A still further object is to provide a coupling unit having only an internal thermostatic control unit whose control capability for a temperature range above a certain level is influenced by fan speed.

A still further object is to provide a unit of simple and reliable construction for achieving the foregoing objects.

In accordance with a typical embodiment of this invention there is provided a fluid coupling unit comprising a casing, a rotor having surfaces in fluid shearing relation to facing surfaces of said casing, a valve means for regulating the amount of fluid supplied to the fluid shear surfaces, an internal thermostatic means responsive to drive fluid temperature for controlling the operation of the valve, and speed responsive means for influencing the effect of the thermostatic control means according to the speed of the fan.

The full nature of the invention will be understood from the accompanying drawing and the following description and claims:

Figure 1:
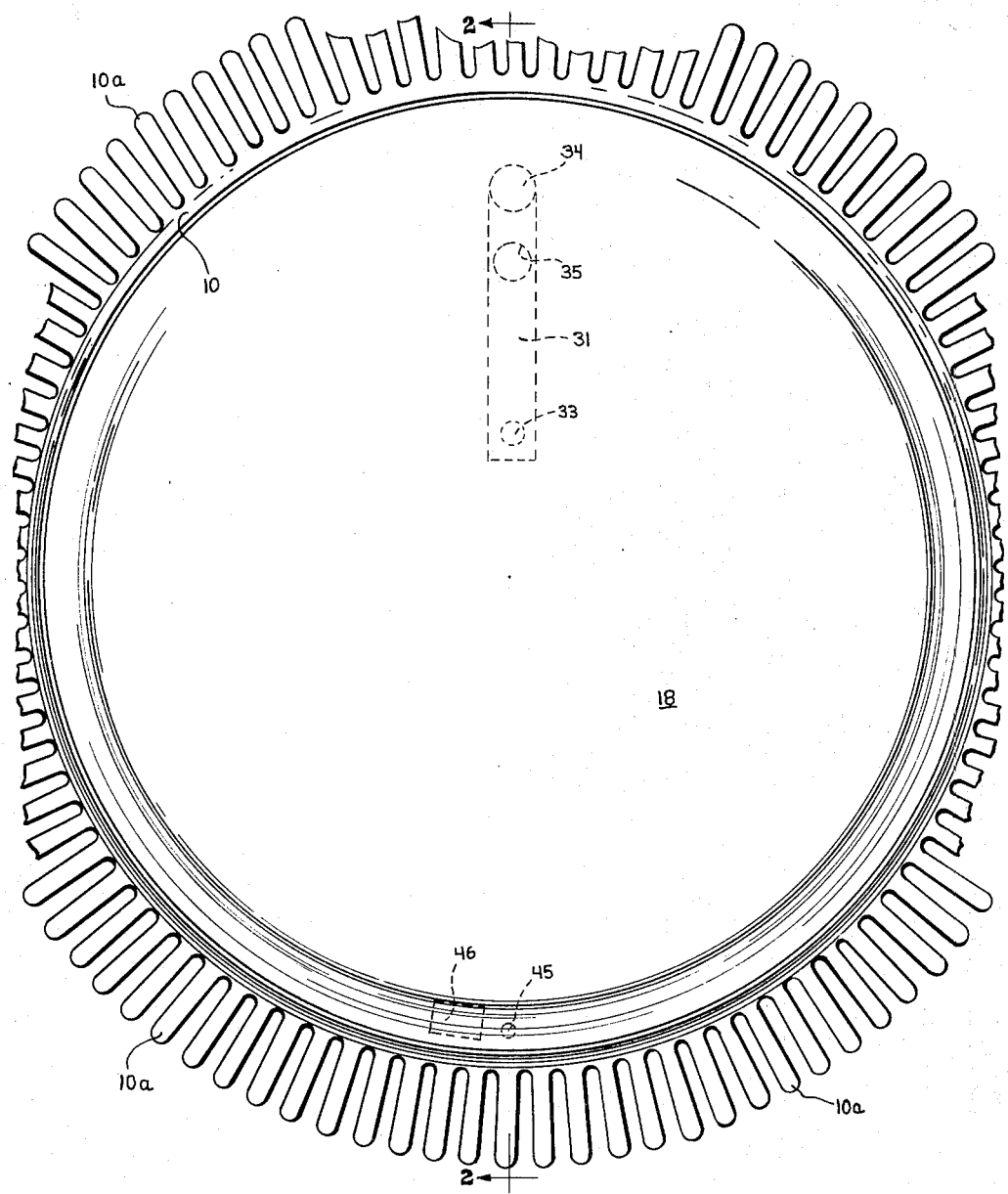
FIG. 1 is a front elevation of the fluid coupling unit embodying this invention.

Referring to the drawings, a typical embodiment of this invention comprises a fluid coupling unit comprising a casing member 10 having a hub 11 for rotatably mounting the casing on a drive shaft 12, there being a conventional sealed bearing assembly 14 for suporting the casing on the shaft. Casing 10 may be provided with cooling fins 10a. Shaft 12 may be integrally connected with a coupling flange 15 for coupling the drive shaft 12 to any convenient rotating part of an internal combustion engine. If the coupling unit is utilized for driving a cooling fan, the blades of the fan may be bolted to casing 10 by means of bolts threadedly engaging a plurality of radially disposed threaded bores 16 and the member 15 may be connected to the pulley which conventionally drives the engine water pump.

Casing 10 may be provided with a cover member 18, the peripheral edges of which engage the peripheral edges of a plate 19 seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of cover 18. Cover 18 is formed and disposed to have spaced relation in respect to plate 19 thereby to provide a fluid reservoir 23 between cover 18 and plate 19. Casing 10 is formed to provide a recess inwardly of the plate 19 thereby to provide a drive chamber 24 within which is mounted the drive disc 26. Shaft 12 carries disc 26 which may be press-fitted or otherwise fixed to the end of shaft 12 whereby rotation of shaft 12 causes disc 26 to rotate within chamber 24. The peripheral portions of disc 26 are covered with arcuate facing members 28 which may be spaced from one another to provide grooves or channels 30 extending between the extreme outer edge of disc 26 and inwardly the entire width of the facing members 28. Grooves 30 provide toroidal circulation of fluid because of the provision of ports 32 located at the inner ends of each one of the grooves 30. This means of providing toroidal circulation of fluid is fully described in my United States Letters Patent No. 2,879,755 granted Mar. 31, 1959.

For controlling the flow of fluid from reservoir 23 into chamber 24 there is provided a bimetallic valve member 31 fixed to the plate 19 by means of the rivet 33 disposed radially inwardly from the port 35 in the plate 19. The valve member 31 covers the port 35, and when the temperature of the fluid in the reservoir 23 increases, the bimetallic feature of the valve member causes it to move away from the port 35 to open port and increase the coupling effect of the unit.

The valve 31 is further controlled by means of the weight 34 secured thereto at a point radially outwardly from the portion covering the port 35. It will be recognized, therefore, that as the speed of the casing 10 increases, and accordingly the fan speed, the weight 34 will tend to offset the effect of increased fluid temperature on the function of the valve 31 to control flow of fluid through port 35.

For providing flow of fluid out of the chamber 24 there is an aperture 45 in plate 19 adjacent the periphery thereof and opening into reservoir 23 and chamber 24. Thus, fluid may flow from reservoir 23 through port 35 into chamber 24 and from chamber 24 through port 45 into reservoir 23. In order to force flow of fluid through port 45, plate 19 is formed to provide a projecting surface 46 located immediately adjacent to port 45 and projecting into chamber 24 into close proximity to the peripheral surface of disc 26. It will be noted that the facing members 28, which are opposite to the inner surface of plate 19, do not extend all the way to the circumferential edge of disc 26 leaving a space opposite the projection 46. Thus, centrifugal force causes fluid to collect in this space in front of projection 46 creating pressure sufficient to force flow of fluid through port 45.

Figure 5:
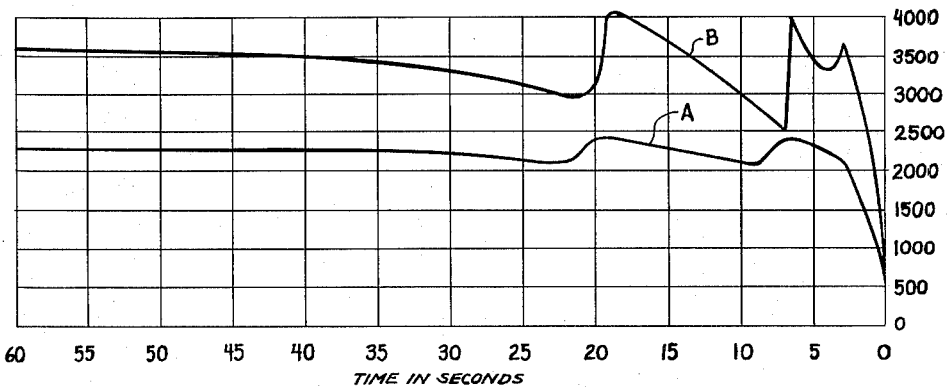
FIG. 5 is a graph illustrating engine speed and fan speed when the coupling unit is controlled only by an external thermostat during the period required to start a vehicle and accelerate up to normal running speeds.

FIG. 5 of the drawings illustrates by curves A and B the change of fan speed (curve A) in relation to engine speed (curve B) when a vehicle is started from a standing position, and only an external thermostat is used for controlling a valve such as that shown in my copending application Ser. No. 115,476, filed June 7, 1961. As the engine transmission operates through its change of gears, engine speeds increase to 3000 r.p.m. to 4000 r.p.m., while fan speeds increase to something less than 2500 r.p.m. With the advent of air conditioning equipment for passenger vehicles it was necessary to provide cooling fans of increased size and to increase the number of blades on such fans. As a consequence, a fan of this character creates objectionable noise when its speed is increased into the range of 2500 r.p.m. during starting operation of the vehicle.

Figure 2:
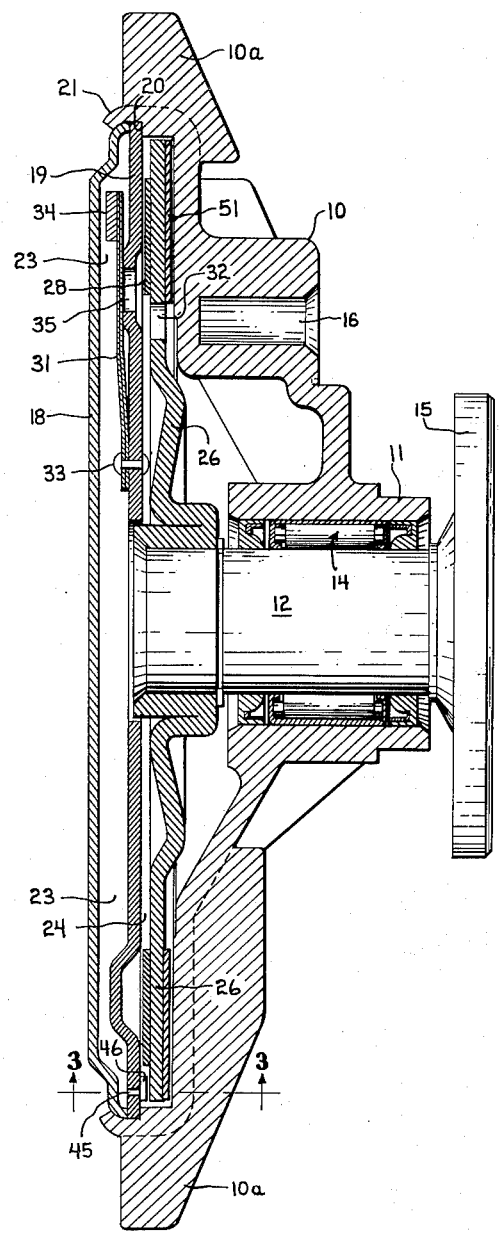
FIG. 2 is a cross section taken on line 2—2 of FIG. 1.
Figure 3:
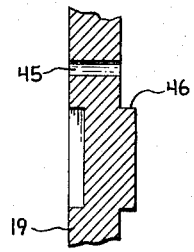
FIG. 3 is a partial cross section taken on line 3—3 of FIG. 2.
Figure 4:
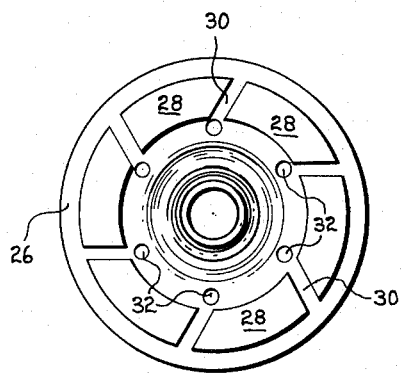
FIG. 4 is a side elevation, in reduced scale, of the drive disc 26 taken from the lefthand side of FIG. 2.
Figure 6:
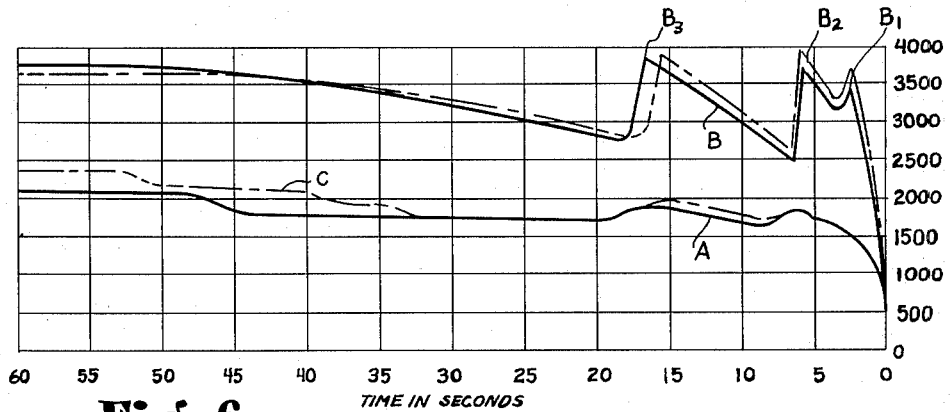
FIG. 6 is a graph illustrating engine speed and fan speed when the fluid coupling unit is controlled by external and internal thermostats, or by only an internal thermostat, during the period required to start a vehicle and accelerate up to normal running speeds.

FIG. 6 of the drawings illustrates the relation between engine speeds and fan speeds when the vehicle is started from a standing position and the transmission operates through its various gear changes. Curve A illustrates the change of fan speeds when the fan is controlled by a fluid coupling having internal and external thermostatic control of flow of fluid as described in connection with FIGS. 1 and 2 of my aforementioned copending application. Curve A shows that fan speeds are of the order of 1500 r.p.m. to something less than 2000 r.p.m. when the engine speed, as illustrated by curve B, increases to speeds of the order of 3500 r.p.m. to 4000 r.p.m. Thus, the fan speeds are reduced in accordance with that invention by using the combination of internal and external thermostatic control devices instead of an external thermostat only. Curve C illustrates performance of a unit having only an internal thermostatic control device.

Figure 7:
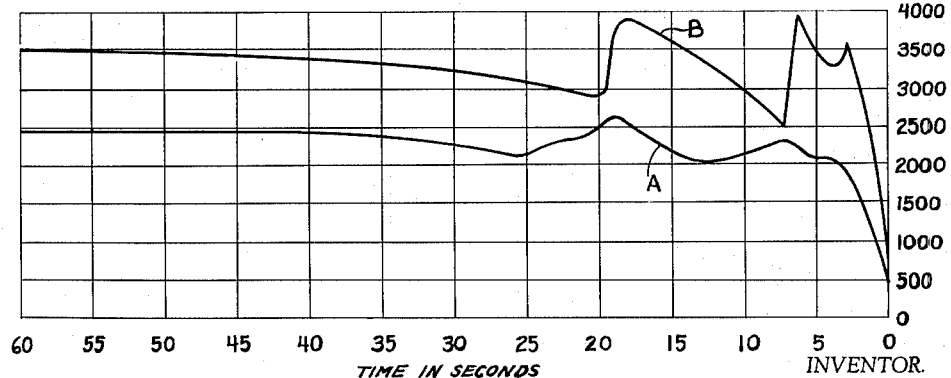
FIG. 7 is a graph illustrating the relation between fan speeds and engine speeds when internal and external thermostats are used and radiating capacity of the coupling unit is reduced.

FIG. 7 of the drawings illustrates the effect of reducing the heat radiating capacity of a coupling unit whose performance has been as illustrated by curve A in FIGURE 6. The temperature change internally of the coupling is so rapid that the degree of coupling between the engine and the fan changes in proportion to the engine speed in substantially the same manner as indicated in FIG. 5. There is no delay of the operation of valve 31 and, therefore, FIG. 7 illustrates clearly the effects of internal temperature on this valve.

Figure 8:
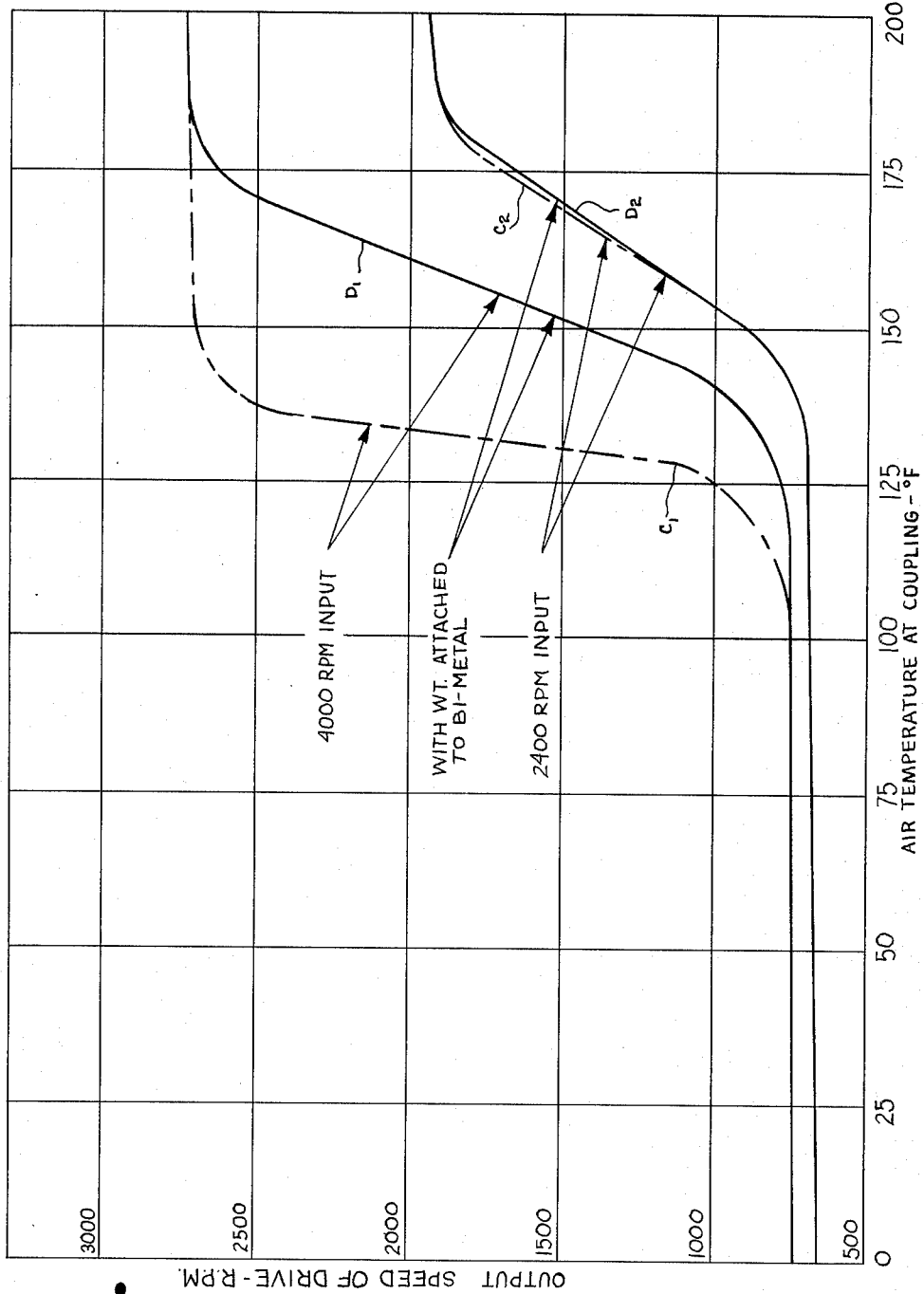
FIG. 8 is a graph comparing performance of the present invention with performance of a unit having an internal thermostat only.

In FIG. 8, curves $C_1$ and $C_2$ represent fan speeds at 4000 r.p.m. and 2400 r.p.m. engine speeds respectively for the unit having only an internal bimetallic valve whose performance is designated by curve C in FIG. 6. Curves $D_1$ and $D_2$ represent performance of the unit of the present invention at the 4000 r.p.m. and 2400 r.p.m. input speeds respectively.

In the operation of the present invention, reservoir 23 may be filled with a fluid such, for example, as an oil, to a degree sufficient to fill the spaces in chamber 24 between the opposing surfaces of the facings 28 and 51 and the adjacent walls of plate 19 and casing 10. If it is assumed that an engine is running at relatively high speed and movement of the vehicle is creating sufficient flow of air through the cooling radiator to operate the engine at its normal temperature, the bimetallic valve 31 assumes its closed position over the port 35, the centrifugal weight 34 having no specific effect in this instance inasmuch as the valve, by thermostatic operation, will tend to close. Therefore, flow of oil from reservoir 23 into chamber 24 is prevented. Any oil within chamber 24 would have accumulated in the peripheral portion of chamber 24 and flowed through port 45 into reservoir 23. There being no substantial amount of oil in chamber 24, there is substantially no coupling from the drive shaft 12 through disc 26 and to the casing 10. Thus the accessory, such as a fan, attached to casing 10 revolves at very low speed. This eliminates the noise of the fan and materially reduces the accessory load on the vehicle engine.

When operating conditions are such that the coolant temperature tends to increase, the temperature of the air flowing out of the radiator and over the casing of the coupling unit increases and accordingly, the temperature of the casing and the fluid in reservoir 23 increases. The result is to cause the bimetallic valve 31 to flex outwardly in a degree approximately proportionate to the increase in radiator air output temperature. While this movement is counteracted to some extent by the weight 34, the extent will depend upon the speed of the fan and, therefore, if the fan is moving comparatively slowly, the effect of the weight will be minimized. This is illustrated in FIG. 8 where the curves $D_2$ and $C_2$ for the 2400 r.p.m. input are much the same.

The oil within reservoir 23 is accumulated by the effects of centrifugal force in the peripheral portion of reservoir 23 and the inner radius of the oil in chamber 23 is less than the radius of the port 35. As the valve 31 opens, the oil being below the port 35, centrifugal force will cause the oil to flow through port 35 into chamber 24. Centrifugal forces cause oil entering chamber 24 to flow outwardly between the facing members 28 and 51 and the adjacent walls of chamber 24. The presence of oil in these spaces creates a coupling effect between disc 26 and casing 10 whereby the shaft 12 rotates the casing and the attached fan. A certain amount of oil will flow from chamber 24 back into the reservoir through port 45, but this amount is much less than the amount flowing through the much larger port 35 and, therefore, an adequate supply of oil remains in chamber 24 to effect the coupling function.

It will readily be apparent that a relatively small increase of air temperature will cause relatively small bending of valve 31, thus allowing a relatively small flow of oil through port 35 and creating a relatively small degree of coupling between the drive disc and the casing. Whenever the air temperature increases by a substantial degree as, for example, on a warm day when the vehicle is ascending a long grade, the bimetallic element will flex to a much greater degree allowing a greater flow of oil through port 35 and creating a much greater degree of coupling between the drive disc and the casing. Thus, there is much less slippage between the drive disc and the casing, and the relative speed of the fan with respect to the speed of the drive shaft increases to a substantial extent.

It is seen, therefore, that the valve 31 will respond to the increased radiator air output temperature to increase the coupling effect between the drive shaft 12 and the casing 10 to increase the fan speed. The increased fan speed will, of course, increase air flow through the radiator to reduce the radiator air output temperature. When the radiator air output temperature has again dropped to the point where the additional fan speed is not required, the casing temperature will tend to be decreased by the lowered output air temperature and accordingly, the coupling fluid temperature will decrease. Therefore, the valve 31 will tend to close, both by reason of the decreased temperature and the centrifugal effect, whereupon the flow of fluid into the chamber 24 is decreased with a corresponding increase in clutch slippage. Thus, the fan speed will decrease.

Consider now the vehicle operation of idling with subsequent acceleration to cruising speed. During idle, internal heat generated by slippage is low since very little torque is required to operate the fan with almost zero slippage at low speeds. The radiating area of the casing is adequate to keep the coupling internal temperature down. Accordingly, valve 31 will be closed. Upon acceleration, engine speeds may increase to values indicated at $B_1$, $B_2$ and $B_3$ in FIG. 6. Valve 31 will remain closed until the internal temperature has increased sufficiently to operate the valve. Thus, there is a high degree of slippage of the disc 26 with respect to the casing 10 whereby internal heat is generated. The final temperature of the fluid within the coupling unit will be a function of the quantity of slip heat and the temperature of the air passing over the coupling housing and dissipating this heat. Since valve 31 is a bimetallic element and will not open until a predetermined internal temperature is reached, there is a time lag from the time that the bimetallic element flexes outwardly to the time that the internal temperature rises sufficiently to cause valve 31 to open the port 35.

Comparison of FIGS. 5 and 6 illustrates this time lag. In FIG. 5 curve A represents fan speed and curve B represents engine speed when the opening and closing of port 35 is controlled only by an external thermostatic element. In FIG. 5 fan speed, 5 seconds after the engine speed is increased from zero, is shown to be approximately 2300 r.p.m. FIG. 6, curve C, shows fan speed after 5 seconds of only approximately 1700 r.p.m. Thus, it is readily apparent that the internal thermostatic valve member 31, without provision for speed control thereof, creates a material reduction of fan speed during acceleration of the vehicle.

The coupling unit with only the internal bimetallic valve 31 and without provision for control thereof according to fan speed, operates satisfactorily under steady state conditions when the combination of radiating surface area and the temperature characteristic of the bimetallic valve 31 are properly selected. It can be assumed that with a constant amount of heat generated due to slippage of the rotor with respect to the casing, the final temperature of the fluid will be determined by the area of the radiating surface consisting of fins 10a and the temperature of the air surrounding the fins. Therefore, the internal bimetallic element is also responsive to the temperature of the surrounding air. Since the amount of heat generated within the coupling unit is a function of the input and output speeds, the internal temperatures at higher input speeds will be higher than the internal temperature at lower input speeds. In order to arrive at the same internal temperature at low input speeds, the surrounding air must be higher in temperature.

FIG. 8, which represents steady state performance of coupling units at various temperatures of surrounding air, indicates that for the unit with a bimetallic control element alone driven at 4000 r.p.m., (curve $C_1$) the coupling effect and, therefore, output speed increases sharply over the temperature range between about 125° F. and 140° F. Thus it can be appreciated that under some circumstances, such as for example, where radiator air temperature is high, radiating surface area is low, and coupling slip speed is high, which generates heat rapidly internally, the effectiveness of the internal bimetallic control element alone in controlling fan speed may be limited.

The result is illustrated in FIG. 7 where, during acceleration of the vehicle, the fan speed follows engine speed more than is desired and raises to values which are objectionable from the noise standpoint.

By providing a construction according to the present invention, the action of the bimetallic control element is controlled by the casing speed to reduce the rate of increase of coupling effect with increased temperature and also raise the level of the temperature range through which coupling is effected. This is illustrated by curve $D_1$ of FIG. 8. Of course, at lower casing speeds the effect on the bimetallic element is less.

It should be apparent from curves in FIG. 8 that steady state operating characteristics are appreciably improved over designs without speed control. Action achieved through the weighted valve which is influenced by centrifugal force matches the fan speed to the temperature of the environs more favorably. As an example, a vehicle operating at an equivalent to 4000 r.p.m. coupling input speed and 150° F. air temperature at front face of coupling would have a controlled fan speed of 1400 r.p.m. If the heat load is increased, fan speed correspondingly increases and, as illustrated in the curve, could reach 2700 r.p.m. at 180° F. with no change in input speed. Similarly, any reduction in heat load will result in lower fan speed. As can be seen from curve $C_1$, in FIGURE 8, which shows characteristics without weight attached to the bi-metal, the temperature at which maximum coupling output occurs is reduced considerably causing excessive fan speed and noise and excessive power consumption when not required to properly cool the vehicle.

It can be recognized from the foregoing description, that the present invention is effective to cause a delay in the speed-up of the fan during the normal gear changes during acceleration of a vehicle until such time as the internal temperature of the coupling unit is high enough to cause the valve to open. However, the delay is extended by reason of the centrifugal force acting on the bimetal valve member. The result is that more heat is required internally to overcome the centrifugal force on the valve than would otherwise be required. Thus, an extremely simple and durable unit is made possible by the present invention which accomplishes the objectives set

The invention claimed is:

1. In a torque transmitting fluid coupling, the combination of a driving element and a driven element, a fluid retaining housing connected with one of said elements, said housing having walls defining a fluid chamber having a supply of fluid therein, a rotor disc connected with the other said element having surfaces extending in close face to face relation with the walls of said chamber whereby torque will be transmitted between said rotor and housing through the shear action of the fluid, a fluid reservoir defined by said walls in said housing, one of said walls having a first port leading to said reservoir from said chamber and a second port disposed radially inwardly of said first port and leading from said reservoir to said chamber, for receiving fluid from said chamber through said first port under pressure of the centrifugal action of said rotor and introducing fluid into said chamber through said second port, and means within said housing for opening and closing said second port comprising a thermostatic element responsive to heat within said housing and having weight characteristics such that speed of rotation of said housing controls the degree of movement of said element.

2. The apparatus as set forth in claim 1 wherein said housing comprises a plate separating said chamber from said reservoir and has said second port formed therein and said means comprises a bimetallic member attached to said plate with a portion extending over said second port.

3. The apparatus as set forth in claim 1 wherein said means comprises a bimetallic member having a portion thereof extending over said port.

4. The apparatus as set forth in claim 1 wherein said means comprises a thermostatic means including a valve member extending over said second port.

5. The apparatus as set forth in claim 2 wherein a weight is secured to said bimetallic member to oppose thermal deformation of said bimetallic member by response of said weight to centrifugal force thereon.

6. In a torque transmitting fluid coupling, the combination of a driving element and a driven element, a fluid retaining housing connected with one of said elements, said housing having walls defining a fluid chamber having a supply of fluid therein, a rotor disc connected with the other said element having surfaces extending in close face to face relation with the walls of said chamber whereby torque will be transmitted between said rotor and housing through the shear action of the fluid, a fluid reservoir defined by said walls in said housing, one of said walls having a first port leading to said reservoir from said chamber and a second port disposed radially inwardly of said first port and leading from said reservoir to said chamber, for receiving fluid from said chamber through said first port under pressure of the centrifugal action of said rotor and introducing fluid into said chamber through said second port, and thermostatic means within said housing responsive to the temperature of said fluid for controlling the opening of said second port and having a weight characteristic effective to modify the control of said opening according to rotational speed of said housing.

References Cited by the Examiner

UNITED STATES PATENTS 2,777,303　1/1957　Slattery _____ 236—93

DAVID J. WILLIAMOWSKY, *Primary Examiner.*